United States Patent [19]

Korger et al.

[11] Patent Number: 5,053,138
[45] Date of Patent: Oct. 1, 1991

[54] PROCESS FOR PURIFYING AN AQUEOUS SOLUTION OF N-METHYL-MORPHOLINE N-OXIDE

[75] Inventors: Dietmar Korger, Steinbach am Attersee; Dieter Eichinger; Stephan Astegger, both of Vöcklabruck; Karin Weinzierl, Timelkam; Johann Männer, Weyregg, all of Austria

[73] Assignee: Lenzing Aktiengesellschaft, Lenzing, Austria

[21] Appl. No.: 595,562

[22] Filed: Oct. 11, 1990

[30] Foreign Application Priority Data

Oct. 16, 1989 [AT] Austria ............................. 2373/89

[51] Int. Cl.$^5$ ............................................. B01D 15/04
[52] U.S. Cl. ................................... 210/670; 210/681; 210/683
[58] Field of Search ...................... 210/670, 683, 681

[56] References Cited

U.S. PATENT DOCUMENTS

| | | | |
|---|---|---|---|
| 4,196,282 | 4/1980 | Franks | 106/168 |
| 4,426,228 | 1/1984 | Brandner | 106/203 |
| 4,581,072 | 4/1986 | Laity | 106/176 |
| 4,880,469 | 11/1989 | Chanzy et al. | 106/203 |

FOREIGN PATENT DOCUMENTS 254199 2/1988 Fed. Rep. of Germany .

Primary Examiner—Stanley S. Silverman
Assistant Examiner—Cynthia L. Nessler
Attorney, Agent, or Firm—Brumbaugh Graves Donohue & Raymond

[57] ABSTRACT

There is disclosed a process for purifying aqueous solutions of N-methyl-morpholine N-oxide (NMMO), such as spinning bath solutions incurred in the production of cellulose products, in which process the solutions to be purified are contacted with an anion exchanger and the purified solutions are separated from the anion exchanger. The process is carried out in one step and the anion exchanger, as functional groups, exclusively contains quaternary tetraalkylammonium groups of the formulae

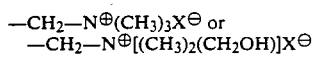

wherein $X^{\ominus}$ represents the anion of an inorganic or organic acid. After this, the anion exchanger is regenerated with an aqueous acidic solution.

6 Claims, No Drawings

PROCESS FOR PURIFYING AN AQUEOUS SOLUTION OF N-METHYL-MORPHOLINE N-OXIDE

The invention relates to a process for purifying aqueous solutions of N-methyl-morpholine N-oxide (NMMO), in particular spin bath solutions incurred in the production of cellulose products, in which process the solutions to be purified are contacted with an anion exchanger and the purified solutions are separated from the anion exchanger.

It is known to introduce cellulose into aqueous NMMO solutions, preparing spinnable homogenous cellulose solutions. By precipitating these solutions in water, films, threads or shaped parts based on cellulose are obtained, i.e., objects that, at present, are produced according to the viscose technique on a large scale. Yet, spinnable solutions of cellulose in aqueous NMMO offer a decisive advantage in terms of environmental safety over viscose: While, in the amino oxide process, NMMO is capable of being recovered from the spin bath and reused, $H_2S$, COS, $CS_2$ and colloidal sulfur form in the viscose method. These substances cannot be recycled, but must be disposed of in an expensive way.

In order to be able to use the NMMO contained in a used spin bath for the production of new spinnable cellulose solutions, the spin bath solution must be purified and concentrated. If no purification takes place, the cellulose solutions will change to dark brown already after few NMMO circulations. In particular, pigment-like anionic compounds will form from polyvalent phenols, from degradation products of cellulose itself and from NMMO stabilizing agents usually having to be admixed to the solution. Gallic acid propylester is known as an effective stabilizing agent. However, it has the property of forming a stable anionic complex with iron such that, without purification, the solvent used several times unavoidably will get enriched with iron.

All these impurities inevitably would build up if the solvent were guided in closed circulation, adversely affecting the qualities of the end products after the spinning process such that, for instance, fibers would not be bleachable any longer.

A method of purifying aqueous NMMO solutions is known from DD-A - 254 199. Accordingly, 5 to 60% by mass of NMMO containing aqueous solutions are conducted through exchange columns packed with styrene divinylbenzene copolymer. These columns, in the first step contain tertiary aminogroups of the type $—CH_2—N(CH_3)_2$, and in the second step contain quaternary ammonium groups of the type as $CH_2—[N(CH_3)_3]OH$, as functional groups.

The large-scale control of the above-mentioned process involves the disadvantage that it must be preformed in two steps. Furthermore, the strongly basic anion exchanger used in the second step must be regenerated with an aqueous solution containing 3% by mass NaOH and 10% by mass NaCl. The regenerating solution used raises problems in respect of waste water and disposal.

It is the aim of the invention to improve the method of purifying aqueous NMMO solutions, as they incur particularly in spin baths at the production of cellulose, with a view to eliminating the disadvantages pointed out above.

With a process of the initially defined kind, this object is achieved according to the invention in that the purification is carried out in a one-step process with an anion exchanger exclusively comprising as functional groups, quaternary tetraalkylammonium groups of the formulae $$—CH_2—N^{\oplus}(CH_3)_3 X^{\ominus} \text{ or}$$
$$—CH_2—N^{\oplus}[(CH_3)_2(CH_2OH)]X^{\ominus}$$

wherein $X^{\ominus}$ represents the anion of an inorganic or organic acid, whereupon the anion exchanger is regenerated with an aqueous acidic solution.

It has proved that the NMMO solutions purified in accordance with the invention—upon concentration—are perfectly suited to preparing new spinnable cellulose solutions and that, despite the use of a single anion exchanger, the circulating solvent does not get enriched with undesired substances.

With the anion exchanger used according to the invention, no absorption of NMMO takes place, either, thus involving no NMMO losses in purification.

The process of the invention is carried out by conducting the solution to be purified through a column packed with the above-defined anion exchanger. In doing so, the anionic impurities are adsorbed on the exchanger such that a purified NMMO solution emerges from the column. The final bed volume, which remains in the column, must be washed off. After distillative concentration of the aqueous NMMO solution, the concentrate obtained can be used directly to prepare new spinnable cellulose solutions.

The impurities adsorbed on the anion exchanger can be eluted in a simple manner by an aqueous acidic solution and separated from NMMO circulation. At the same time, the anion exchanger is regenerated.

An advantageous embodiment of the process according to the invention consists in that an anion exchanger is used, whose anion $X^{\ominus}$ is derived from a volatile acid, in particular carbonic acid, formic acid or acetic acid. By using a volatile acid, the disposal of the regenerating acid is effected simply by burning. Formic acid and acetic acid also can be reclaimed by distillation.

Moreover, it has proved favorable if the regenerating acid additionally contains up to 5% by mass of a hydroxycarboxylic acid, in particular, tartaric acid. Thereby, the elution of the iron stabilizing complex is promoted in regenerating the anion exchanger.

The process according to the invention is particularly suited for the purification of aqueous NMMO solutions having an NMMO content of up to 65% by mass.

The invention will be explained in more detail by the following examples.

The content of impurities in the NMMO solutions was determined by way of absorption spectroscopy, an extinction factor having been calculated from the extinction values at 260 nm, 300 nm and 400 nm according to the following formula:

$$\text{Extinction factor} = \frac{\text{Extinction} \times 1000}{\% \text{ by mass } NMMO}$$

The higher the extinction factor, the more impure the solution. Thus, the degree of purification attained by the invention can be taken from a comparison of the extinction values prior and after purification.

EXAMPLE 1

The spin bath solution to be purified contained 20% by weight NMMO, having the extinction factors apparent from Table 1. For purification, 1,063 ml of the anion exchanger Lewatit MP-500 (functional group: —CH$_2$—N$^{\oplus}$(CH$_3$)$_3$) in its formate form were treated with 37,200 ml spin bath solution in order to load the exchange resin with the impurities. The spin bath solution to be purified contained 28 ppm iron.

After this, the purified spin bath solution remaining in the resin was washed from the resin by means of 4,252 ml water. As can be taken from the extinction factors of the eluted solution (Table 1), the major part of impurities was retained by the exchange resin. The Fe content was as low as 4 ppm.

The purified diluted solution was concentrated to an NMMO content of 60% by weight by distillation and could be used directly for the production of spinnable cellulose solutions without additional purification.

To regenerate the anion exchanger, the impurities were eluted with an aqueous solution containing 10% by weight of formic acid and 0.2% by weight of tartaric acid.

TABLE 1

| | % by weight NMMO | Extinction factors at | | |
|---|---|---|---|---|
| | | 260 nm | 300 nm | 400 nm |
| Spin bath | 20 | 0.290 | 0.219 | 0.016 |
| Purified solution | 18 | 0.098 | 0.087 | 0.001 |

EXAMPLE 2

Mode of procedure analogous to Example 1 with DOWEX-D-1 (manufacturer: Dow Chemical; functional group: —CH$_2$—N$^{\oplus}$(CH$_3$)$_3$ in its formate form being used as and anion exchanger.

Extinction factors of the washed-out solution:

| nm | Extinction factor |
|---|---|
| 260 | 0.109 |
| 300 | 0.097 |
| 400 | 0.001 |

EXAMPLE 3

500 ml of the anion exchanger Lewatit MP-500 in its formate form were treated with 6,000 ml of a 62% by weight aqueous NMMO solution (Table 2), the impurities being retained by the exchange resin.

After this, the purified solution finally remaining within the resin was washed out of the resin with 4,000 ml water and was reused for the preparation of spinnable cellulose solutions. To regenerate the anion exchanger, the impurities were eluted with an aqueous 10% by weight formic acid.

TABLE 2

| % by wt. NMMO | | Extinction factors at | | |
|---|---|---|---|---|
| | | 340 nm | 400 nm | 450 nm |
| NMMO solution to be purified | 62 | 1.366 | 0.555 | 0.32 |
| Purified solution | 43 | 0.404 | 0.109 | 0.07 |

EXAMPLE 4

Mode of procedure analogous to Example 3 with DOWEX-D-1 in its formate form being used as the anion exchanger.

Extinction factors of the washed-out solution:

| nm | Extinction factor |
|---|---|
| 340 | 0.216 |
| 400 | 0.085 |
| 450 | 0.051 |

What we claim is:

1. In a process for purifying an aqueous solution of N-methyl-morpholine N-oxide (NMMO) by providing an anion exchanger, contacting the solution to be purified with said anion exchanger so as to obtain a purified solution and separating said purified solution from said anion exchanger, the improvement wherein said process is carried out in one step, said anion exchanger contains functional groups exclusively comprising quaternary tetraalkylammonium groups selected from the group consisting of the formulae —CH$_2$—N$^{\oplus}$(CH$_3$)$_3$X$^{\ominus}$ and
—CH$_2$—N$^{\oplus}$[(CH$_3$)$_2$(CH$_2$OH)]X$^{\ominus}$ wherein X$^{\ominus}$ represents the anion of an inorganic or organic acid, whereupon an aqueous acidic regenerating solution is provided to regenerate said anion exchanger.

2. A process as set forth in claim 1, wherein said anion exchanger has an anion X$^{\ominus}$ derived from a volatile acid.

3. A process as set forth in claim 2, wherein said volatile acid is selected from the group consisting of carbonic acid, formic acid and acetic acid.

4. A process as set forth in claim 1, wherein said aqueous regenerating solution comprises an acid selected from the group consisting of formic acid, acetic acid and carbonic acid, and up to 5% by mass of a hydroxycarboxylic acid.

5. A process as set forth in claim 4, wherein said hydroxycarboxylic acid is tartaric acid.

6. A process as set forth in claim 1, wherein said aqueous solution of N-methyl-morpholine N-oxide (NMMO) contains up to 65% by mass of NMMO.

* * * * *